US008968091B2

(12) United States Patent  (10) Patent No.: US 8,968,091 B2
Raptis et al.  (45) Date of Patent: Mar. 3, 2015

(54) SCALABLE REAL-TIME MOTION RECOGNITION

(75) Inventors: Michalis Raptis, Athens (GR); Chuck Noble, Issaquah, WA (US); Joel Pritchett, Duvall, WA (US); Hugues Hoppe, Redmond, WA (US); Darko Kirovski, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 13/410,644

(22) Filed: Mar. 2, 2012

(65) Prior Publication Data

US 2012/0165098 A1 Jun. 28, 2012

Related U.S. Application Data

(63) Continuation of application No. 12/876,979, filed on Sep. 7, 2010, now abandoned.

(51) Int. Cl.
*A63F 13/00* (2014.01)
*A63F 13/40* (2014.01)

(52) U.S. Cl.
CPC .......... *A63F 13/10* (2013.01); *A63F 2300/1093* (2013.01); *A63F 2300/6045* (2013.01)
USPC .................... 463/32; 463/30; 463/31; 463/43

(58) Field of Classification Search
USPC .......................... 463/36, 39, 42, 43, 30, 31, 32
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 101254344 B 6/2010
EP 0583061 A2 2/1994
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.
Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
(Continued)

*Primary Examiner* — James S McClellan
(74) *Attorney, Agent, or Firm* — Miia Sula; Judy Yee; Micky Minhas

(57) ABSTRACT

Human body motion is represented by a skeletal model derived from image data of a user. The model represents joints and bones and has a rigid body portion. The sets of body data are scaled to a predetermined number of sets for a number of periodic units. A body-based coordinate 3-D reference system having a frame of reference defined with respect to a position within the rigid body portion of the skeletal model is generated. The body-based coordinate 3-D reference system is independent of the camera's field of view. The scaled data and representation of relative motion within an orthogonal body-based 3-D reference system decreases the data and simplifies the calculations for determining motion thus enhancing real-time performance for multimedia applications controlled by a user's natural movements.

20 Claims, 18 Drawing Sheets

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,581,276 A | 12/1996 | Cipolla et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A * | 12/1999 | Latypov et al. | 345/156 |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,941,239 B2 | 9/2005 | Unuma et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,447,334 B1 | 11/2008 | Jiang et al. |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |

(56) References Cited

U.S. PATENT DOCUMENTS

| | | | |
|---|---|---|---|
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,685,433 | B2 | 3/2010 | Mantyjarvi et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2008/0026838 | A1 | 1/2008 | Dunstan et al. |
| 2008/0152191 | A1 | 6/2008 | Fujimura et al. |
| 2009/0141933 | A1 | 6/2009 | Wagg |
| 2009/0221368 | A1 | 9/2009 | Yen et al. |
| 2010/0177933 | A1* | 7/2010 | Willmann et al. ............ 382/107 |
| 2010/0290538 | A1* | 11/2010 | Xu et al. .................. 375/240.28 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen—Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Zhao, Liang, "Dressed Human Modeling Detection and Parts Localization," The Robotics Institute, Carnegie Mellon University, Pittsburgh, PA, Jul. 26, 2001, 121 pages.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Zhang, Z., "3D Periodic Human Motion Reconstruction from 2D Motion Sequences", Proceedings of the 2004 IEEE Computer Society Conference on Computer Vision and Pattern Recognition Workshops, Jun. 2004, pp. 186-186, Queen's University, Canada.

Chirikjian, G. S., "Engineering Applications of the Motion-Group Fourier Transform", in: Modern Signaling Processing, 2003, pp. 63-77, MSRI Publications.

Bodor, R., "Image-Based Reconstruction for View-Independent Human Motion Recognition", Artificial Intelligence, Robotics and Vision Laboratory Dept. of Computer Science and Engineering, Technical Report, Mar. 25, 2003, pp. 2-19, University of Minnesota.

Elgammal, A., "Manifold Models for Human Motion Analysis", My Research, Rutgers University, [retrieved on May 4, 2010], 4 pages, Retrieved from the Internet:<URL:http://www.cs.rutgers.edu/~elgammal/my_research.htm.

Patin, F., "Motion Detection and Tracking", An Introduction to Digital Image Processing, [online], [retrieved on May 3, 2010], Retrieved from the Internet:<URL:http://www.gamedev.net/reference/programming/features/imageproc/page3.asp.

Ormoneit, D., "Representing Cyclic Human Motion using Functional Analysis", Aug. 5, 2005, 32 pages, in: Image and Vision Computing (Dec. 2005) vol. 23, Issue 14, pp. 1264-1276, Butterworth-Heinemann, Newton, MA, USA.

* cited by examiner

SCALABLE REAL-TIME MOTION RECOGNITION

CLAIM OF PRIORITY

This application is a continuation application of U.S. application Ser. No. 12/876,979, "SCALABLE REAL-TIME MOTION RECOGNITION," filed on Sep. 7, 2010, which is incorporated herein by reference in its entirety.

BACKGROUND

In the past, computing applications such as computer games and multimedia applications used controls to allow users to manipulate game characters or other aspects of an application. Typically such controls are input using, for example, controllers, remotes, keyboards, mice, or the like. More recently, computer games and multimedia applications have begun employing cameras and software gesture recognition engines to provide a human computer interface ("HCI") or natural user interface ("NUI"). With HCI or NUI, user motions are detected, and some motions or poses represent gestures which are used to control game characters (e.g., a user's avatar) or other aspects of a multimedia application.

In a natural user interface, an image capture device captures images of the user's motions in its field of view. The field of view can be represented as a finite Euclidean three-dimensional (3-D) space. A user can be performing a gesture with a body part but the user also tends to move around in the field of view of the capture device. A person extending her arm as a gesture while dancing about the room will generate a motion trajectory that will require more processing to decouple the arm action from the effect of the dancing motion. Additionally, users perform gestures at different speeds, providing another factor for which to account in gesture determination. Furthermore, the gesture recognition and subsequent responsive action need to be done in real-time and processed within the frame rate of the NUI system.

SUMMARY

Technology is presented for scalable, real-time motion recognition of a human body motion based on a skeletal model derived from image data of a user. The skeletal model represents the human body as a model of joints and bones and having a rigid body portion. Sets of skeletal data representing motion in terms of the human skeletal model are received which are defined in a camera-based three-dimensional (3-D) coordinate reference system. A camera-based 3-D reference system has a frame of reference defined with respect to an origin in a camera's field of view.

Technology is further presented for temporal scaling the received skeletal data by synchronizing the sets of skeletal data to a predetermined number of sets for a number of periodic units. An example of a periodic unit is a repetitive beat of music. It is contemplated that the periodic unit may have a constant or variable frequency.

In embodiments, the camera-based 3-D reference system may be spatially transformed to a body-based coordinate 3-D reference system having a frame of reference defined with respect to a position within the rigid body portion of the skeletal model. The body-based coordinate 3-D reference system is independent of the camera's field of view.

For each set in the temporal scaled, spatial transformed skeletal data sets, the system determines motion of at least one body part using the rigid body-based 3-D reference system. Furthermore, gesture recognition is performed based on motion represented with respect to the body-based 3-D reference system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The systems, methods, and computer readable storage media for scalable real-time motion recognition based on skeletal data in accordance with this specification are further described with reference to the accompanying drawings.

DETAILED DESCRIPTION

Figure 1A:
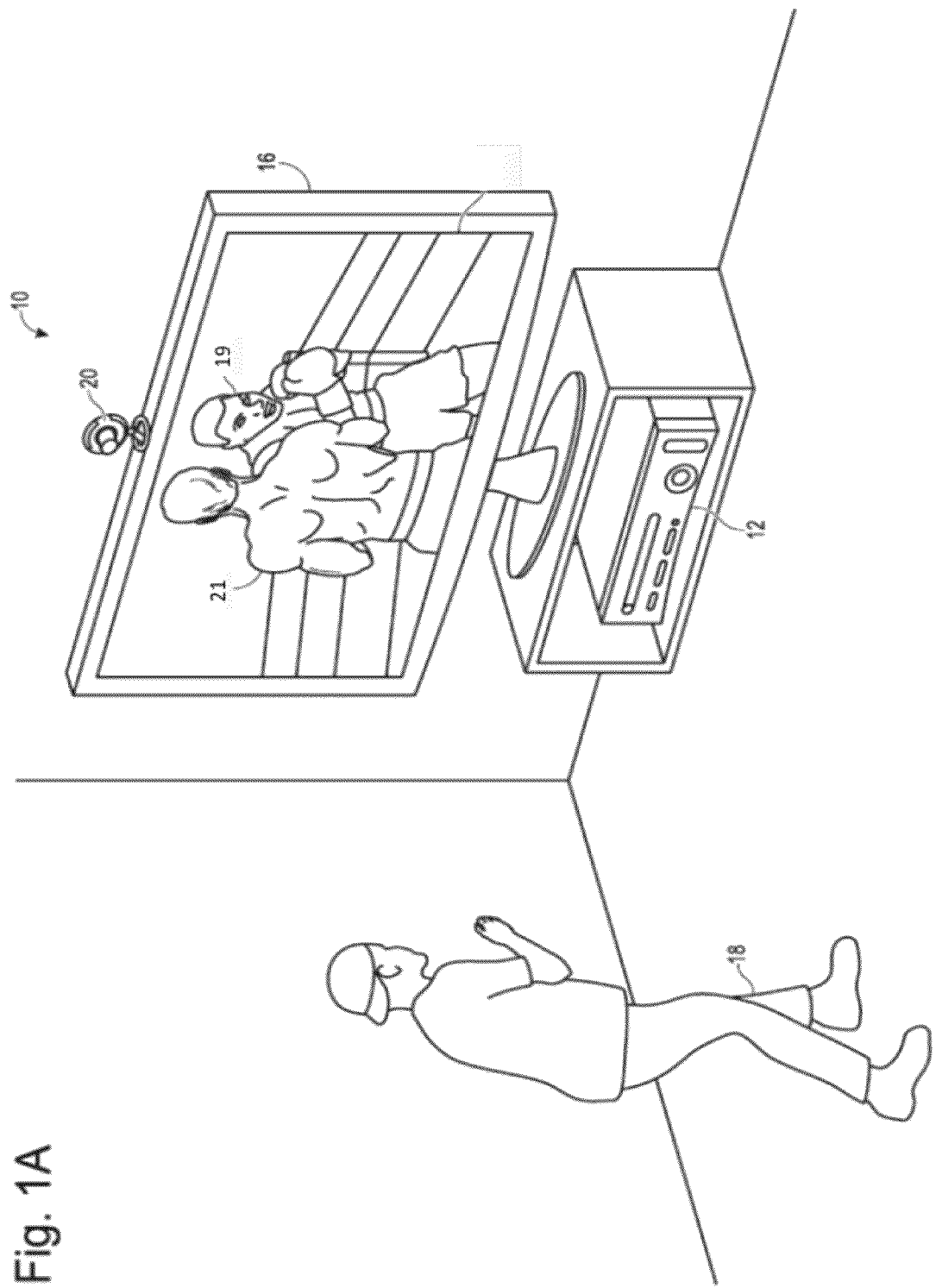
FIG. 1A illustrates an example embodiment of a target recognition, analysis, and tracking system with which a user is interacting, and in which technology embodiments for scalable real-time motion recognition can operate.

Referring initially to FIG. 1A, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application, and an audiovisual device 16 for providing audio and visual representations from the gaming or other application. The system 10 further includes a capture device 20 for capturing positions and movements performed by the user, which the computing environment receives, interprets and uses to control the gaming or other application. Each of these components is explained in greater detail below.

As shown in FIG. 1A, in an example embodiment, the application executing on the computing environment 12 may be a game with real time interaction such as a boxing game that the user 18 may be playing. For example, the computing environment 12 may use the audiovisual device 16 to provide a visual representation of a boxing opponent 19 to the user 18. The computing environment 12 may also use the audiovisual device 16 to provide a visual representation of a player avatar 21 that the user 18 may control with his or her movements. For example, the user 18 may throw a punch in physical space to cause the player avatar 21 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 21 in game space.

Figure 1B:
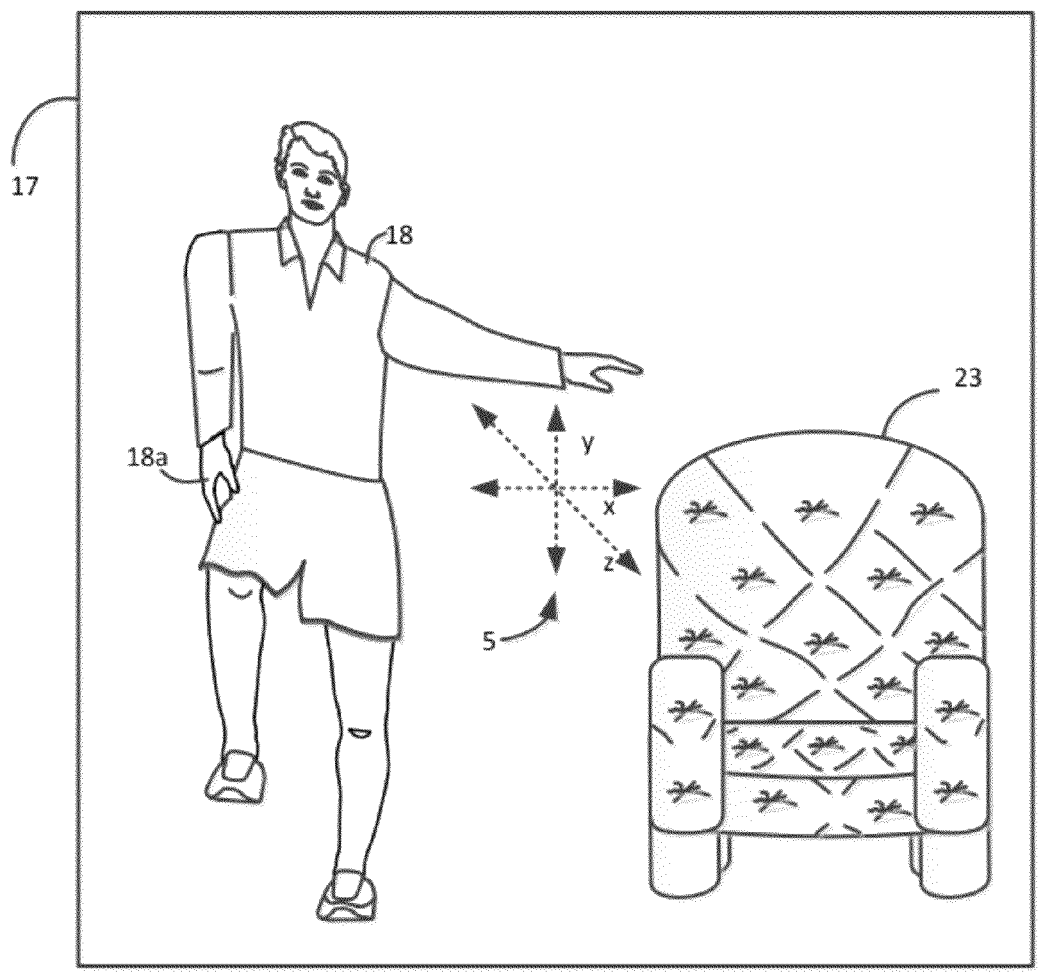
FIG. 1B illustrates embodiments of a camera field of view and a 3-D orthogonal coordinate reference system defined within the field of view.

Other movements by the user 18 may also be interpreted as other controls or actions, such as controls to bob, weave, shuffle, block, jab, or throw a variety of different power punches. FIG. 1B illustrates embodiments of a camera field of view 17 and a 3-D orthogonal coordinate reference system defined within the field of view. In this example, user 18 is interacting with a dance exercise application in which the user is dancing to music. The movements of user 18 are captured by the capture device 20, which, in conjunction with computing environment 12, animates and controls the movements of an avatar on a display just like in the boxing example. Some of his movements may be gestures.

The origin of a 3-D orthogonal coordinate reference system is depicted in the center of the camera's 20 field of view which is located between the user 18 and his arm chair 23. A skeletal model as discussed below is derived from each captured image frame, and initially the skeletal model is represented in this camera-based coordinate system. This coordinate system is called camera-based because the position of the camera determines the field of view and the space is characterized using planes and normals defined with respect to the camera. The camera-based reference system is fixed. It does not move with the user.

Figure 1C:
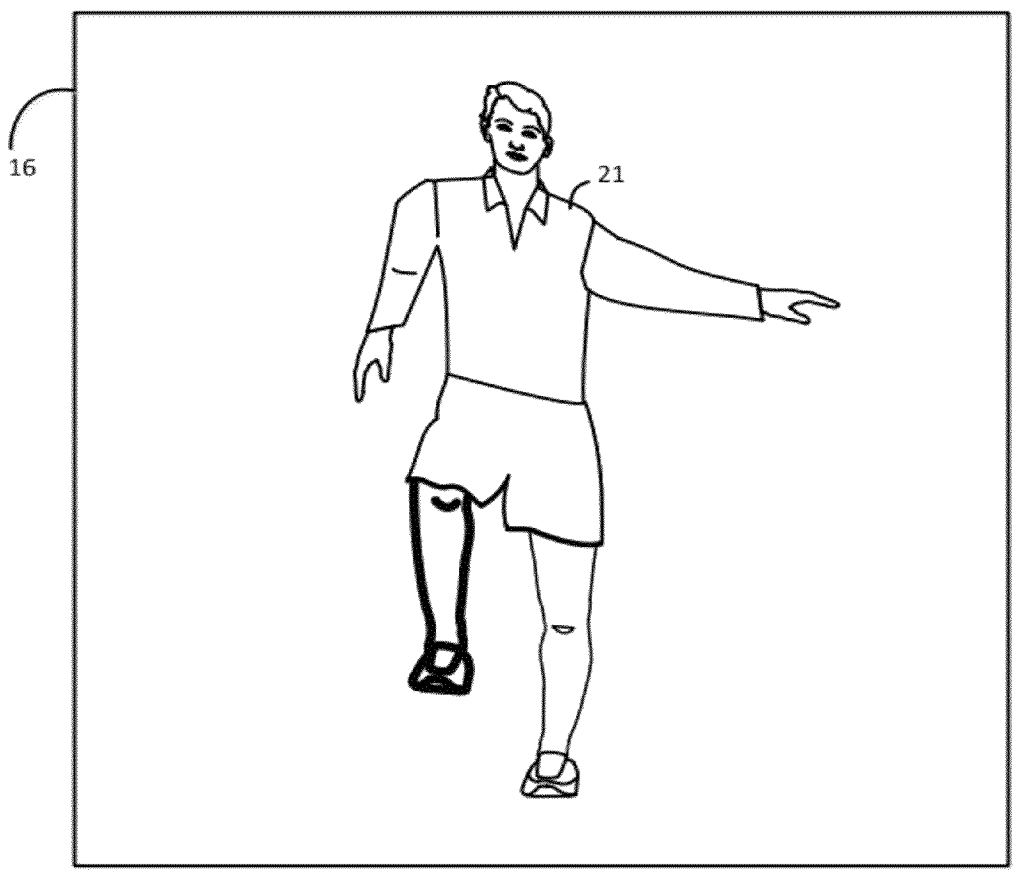
FIG. 1C illustrates an example of a visually distinctive indicator providing feedback to a user on his performance.

FIG. 1C illustrates an example of a visually distinctive indicator 11 displayed to a user on the user's avatar 21 on audiovisual device 16 providing feedback to the user 18 on his performance. His right leg of avatar 21 is highlighted 11 on the audiovisual device 16 to provide visual feedback that the user's leg lift with his right leg is not meeting a standard, for example height, of a leg lift gesture of a model or the average performed by others using the dance exercise game.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

Figure 2:
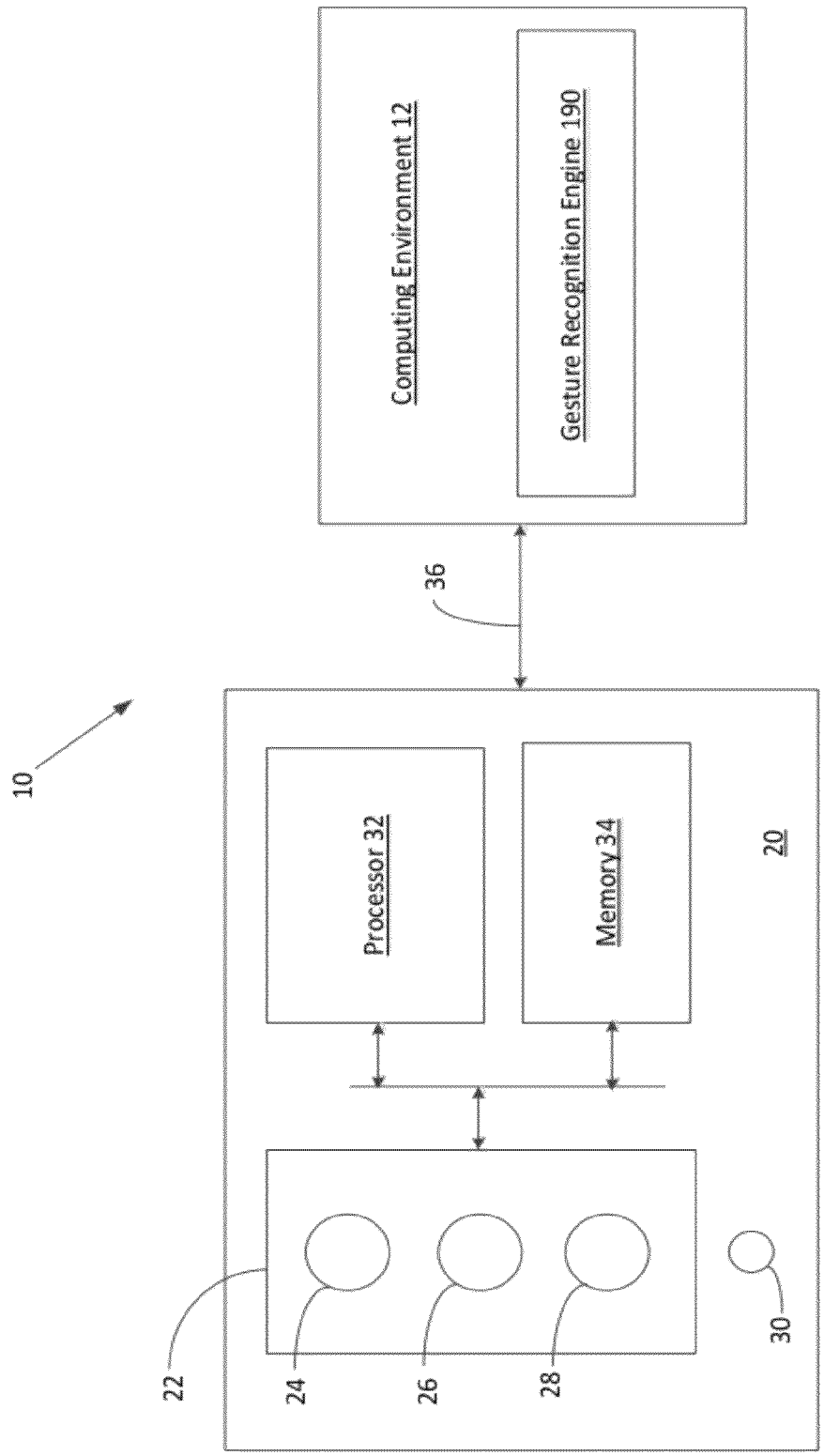
FIG. 2 illustrates an example embodiment of a capture device that may be used in an embodiment of a target recognition, analysis, and tracking system.

FIG. 2 illustrates an example embodiment of the capture device 20 that may be used in the target recognition, analysis, and tracking system 10. Further details relating to a capture device for use with the present technology are set forth in one or more of the above co-pending patent applications. However, in an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, neck, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may track the skeletal model and render an avatar associated with the skeletal model. The computing environment may further determine which controls to perform in an application executing on the computer environment based on, for example, gestures of the user that have been recognized from the skeletal model. For example, as shown, in FIG. 2, the computing environment 12 may include a gesture recognition engine 190. The gesture recognition engine 190 is explained hereinafter, but may in general include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognition engine 190 to identify when a user (as represented by the skeletal model) has performed one or more gestures. Those gestures may be associated with various controls of an application. Thus, the computing environment 12 may use the gesture recognition engine 190 to interpret movements of the skeletal model and to control an application based on the movements.

Figure 3A:
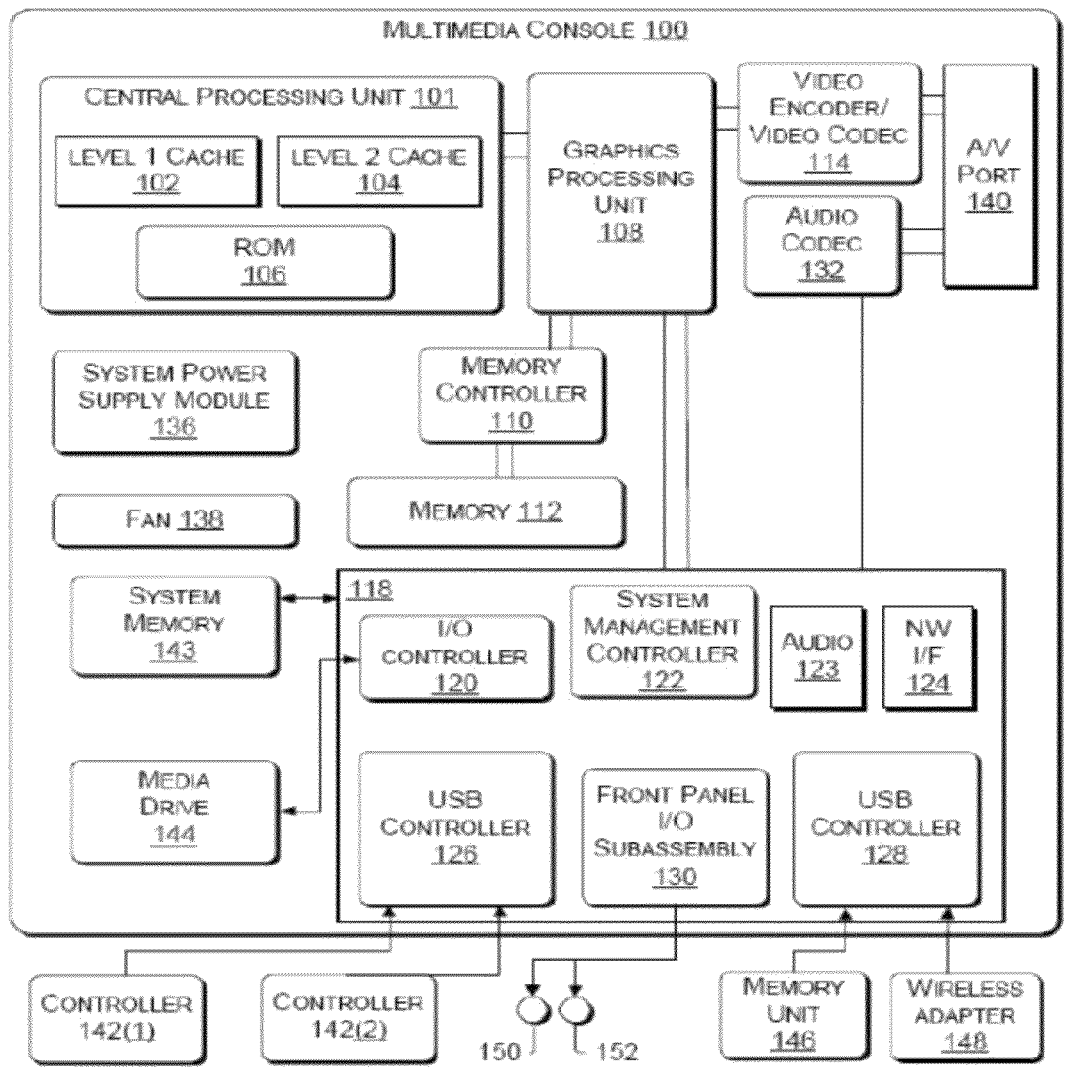
FIG. 3A illustrates an example embodiment of a computing environment that may be used to recognize human body motion in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
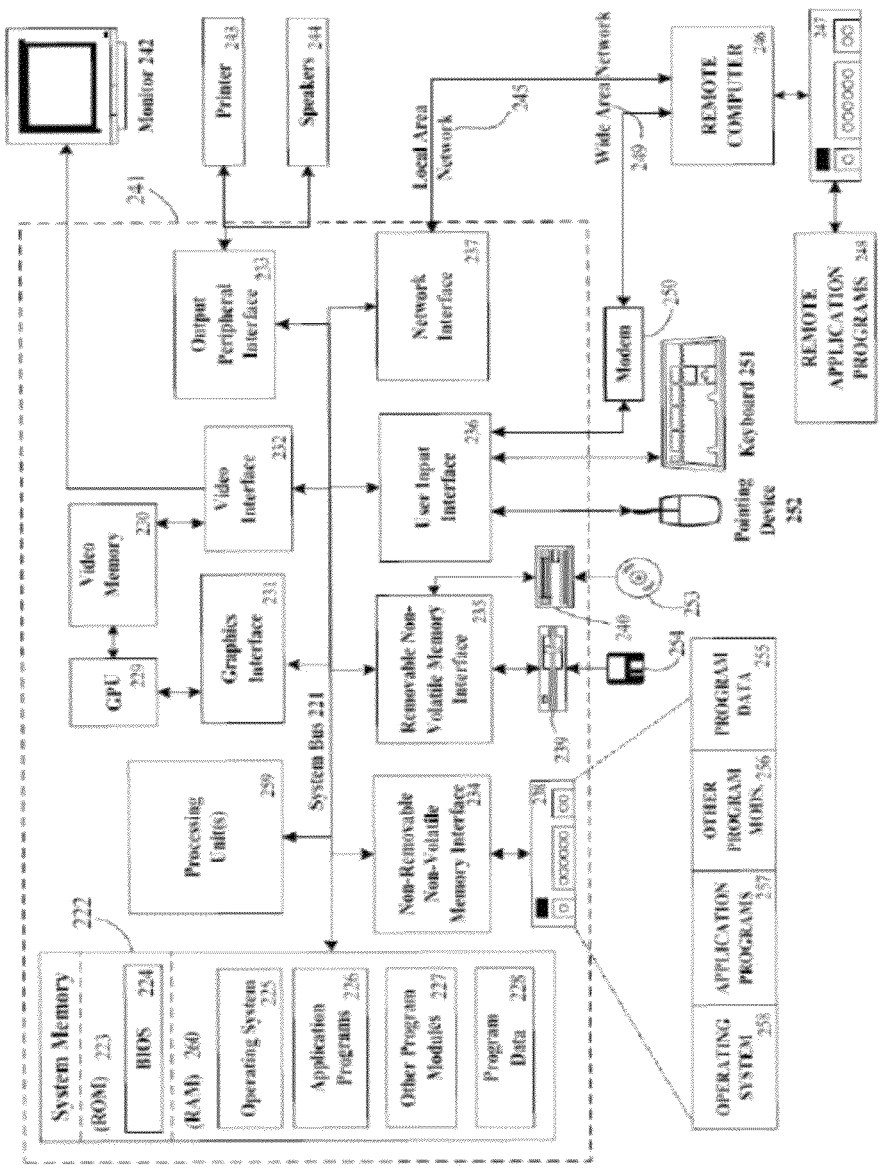
FIG. 3B illustrates another example embodiment of a computing environment that may be used to recognize human body motion in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4:
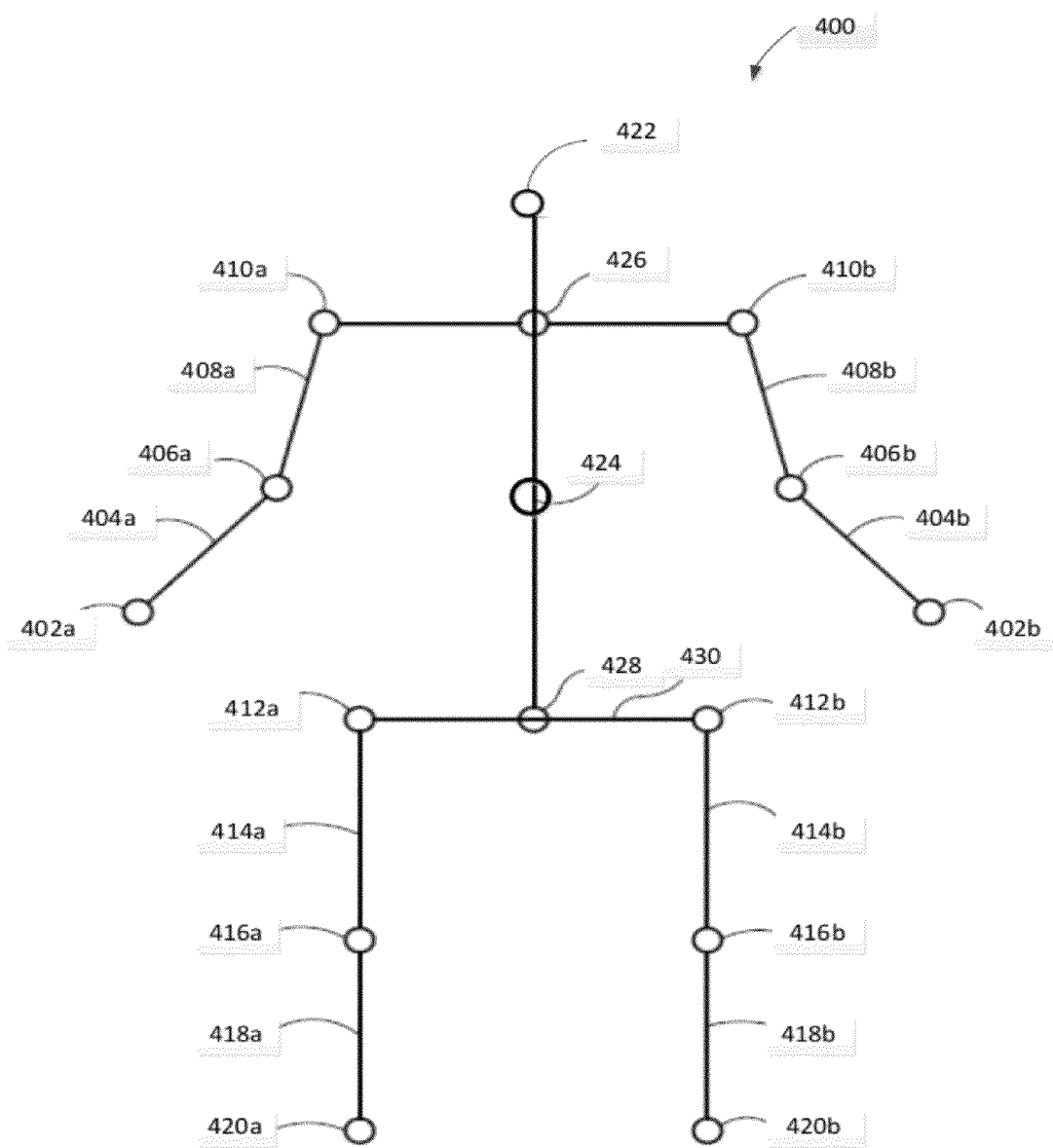
FIG. 4 illustrates an example of a skeletal model of a user that can be used by one or more embodiments.

FIG. 4A depicts an example skeletal mapping of a user that may be generated from the capture device 20. In this embodiment, a variety of joints and bones are identified: each hand 402, each forearm 404, each elbow 406, each bicep 408, each shoulder 410, each hip 412, each thigh 414, each knee 416, each foreleg 418, each foot 420, the head 422, the mid spine 424, the top 426 and the bottom 428 of the spine, and the waist 430. Where more points are tracked, additional features may be identified, such as the bones and joints of the fingers or toes, or individual features of the face, such as the nose and eyes. It is understood that one or more of the points shown in FIG. 4A may be omitted and/or others may be added. Moreover, a skeletal mapping is one example of a computer model of a user, and other computer models are contemplated.

Each of the points in FIG. 4A may be described in 3-dimensional Cartesian space by an x, y and z coordinate in a frame of reference with respect to the capture device 20 (camera space). One consequence of this is that any absolute motion of a joint in this reference frame needs to be computed. For example, referring again to FIG. 1B if the user 18 is moving in the frame of reference with his hand 18a straight down and stationary with respect to his body, that hand is nonetheless moving in camera space frame of reference. Time and processor resources are required to determine its movement in camera space relative to a prior frame.

It is an aspect of the present technology to conform, or transform, the frame of reference of body parts from camera space where absolute motion is measured to a frame of reference where motion is measured relative to an "upstream" joint. This frame of reference is referred to as a body space or body frame of reference. In one embodiment, an upstream joint is the next adjacent joint closer to the torso. So the upstream joint of the wrist is the elbow, and the upstream joint of the elbow is the shoulder; the upstream joint of the ankle is the knee, and the upstream joint of the knee is the hip.

Rigid-body transformation (e.g., translation and rotation) from the camera frame of reference to the body frame of reference provides the same information as to joint position, but does so in more efficient and low entropy manner. Continuing with the above example where the user is moving through the field of view with his hand 18a stationary at his side, while moving in absolute (camera) space, the user's hand is not moving relative to its upstream joint. Thus, tracking the user's hand in body space simplifies joint tracking from frame to frame. In general, tracking movement of joints relative to other joints results in smaller search space and data set, and faster processing and gesture recognition as explained below. It is a representation which is invariant to the group of similarity transformations (scaling, rotation, translation) in 3D.

As is also explained below, another aspect of the present technology is to treat the torso, including the shoulders and hips, as a rigid body. This good approximation allows the torso to be described with three angles, described below, relative to camera space, simplifying skeletal tracking.

Figure 5:
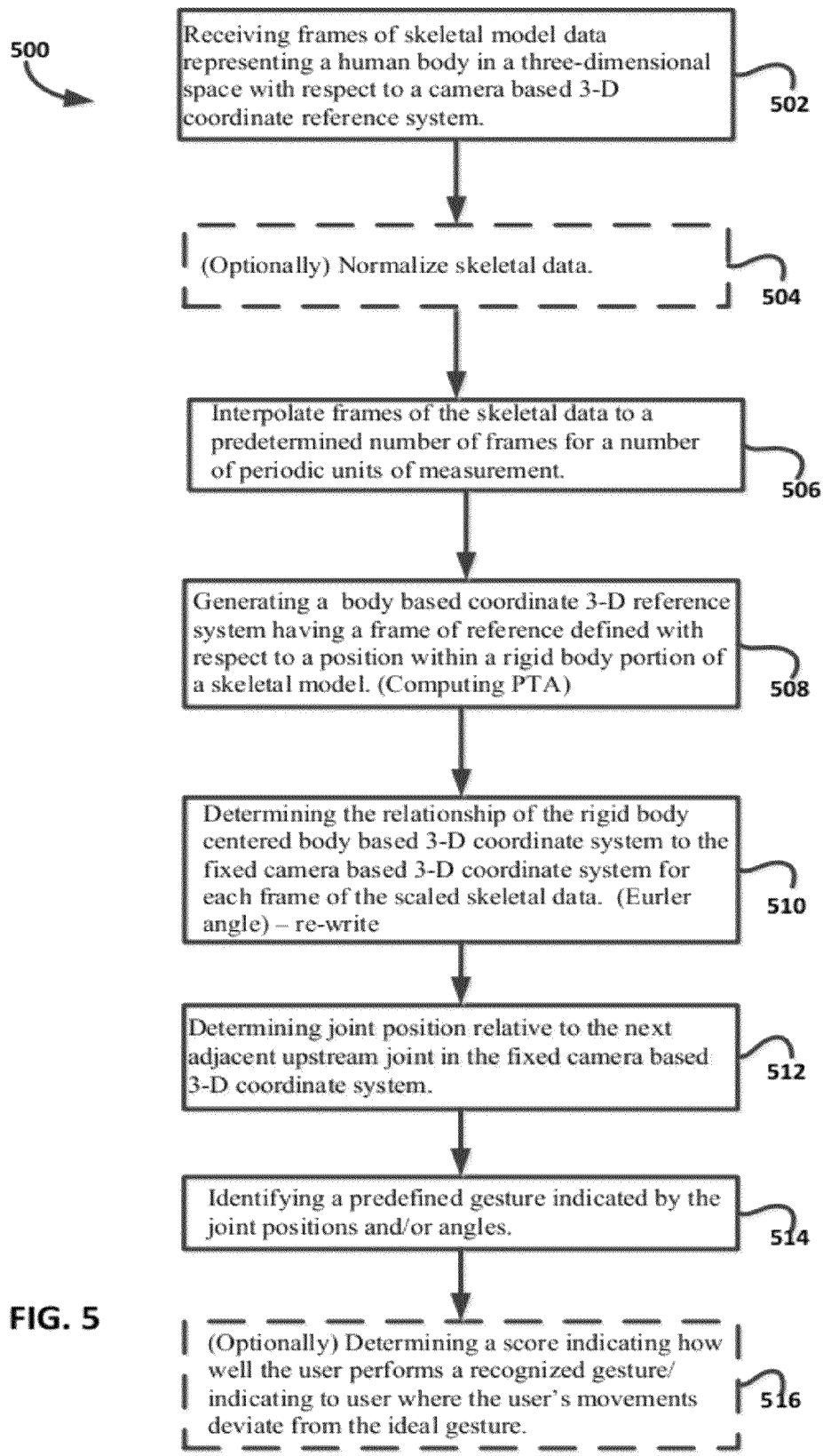
FIG. 5 is a flowchart of an embodiment of a method for scalable real-time gesture recognition.

An embodiment of the present technology will now be explained with reference to the flowchart of FIG. 5. The method may be performed by software executing on one or more processors such as the processor 32 of capture device 20, the CPU 101 (FIG. 3A) or the processing unit 299 (FIG. 3B) of the computing environment 12 for a target recognition, analysis tracking and tracking system 10.

Frames of skeletal model data are received in step 502 from capture device 20 representing a human body in a three-dimensional space with respect to the fixed camera-based 3-D coordinate reference system. Optionally, the size of bones in the sets of skeletal data are normalized 504. In particular, different users may be of different sizes, with limbs and torsos of different sizes. In step 504, the distances measured between joints for a given user are normalized to a standard length for such distances. This can be done on the received skeletal model data or on the scaled skeletal data sets. In embodiments, the normalization of the size of bones in step 506 may be omitted.

One goal of the present system is to identify movements, such as dance movements of a user when dancing to music played by an application running on computing environment 12. The present system makes use of the fact that movements, such as dance movements, are typically repetitive. There are basic movements at each beat of the music, with a combination of these basic movements forming a multi-beat motion that itself repeats. Thus, a user may repeat a given movement once per beat of music, or sets of beats. As the music speeds up, the user tends to move faster. As the music slows down, the user tends to move slower. The result is that the movements a user tends to make repeat every beat, or predefined number of beats. Accordingly, the present system analyzes repetitive movements over a period not based in time, but rather based on the beat of the music (or other periodic unit of measurement).

In particular, in step 506, software executing in the system normalizes the number of frames of skeletal data to a periodic unit of measurement to provide normalized skeletal data sets. An example of a periodic unit of measure is a predefined number of beats in music. By normalizing the number of frames to the beat of music, or some other periodic unit of measurement, the present system is able to normalize repetitive user movements to a fixed period, independent of time. For music having a faster beat, the number of frames in the period over which a user completes one cycle of movement will be faster. For music having a slower beat, the number of frames in the period over which a user completes a cycle of movement will be slower. However, the period itself is independent of time.

The beat of the music and how it changes in a piece is predetermined generally, but it can be detected as well using music software if necessary. By using beats as a reference, rather than time, gestures can be recognized independently of the speed at which they are made. Normalizing the number of frames to a beat or other period simplifies calculations in real-time gesture recognition by making it easier to identify repetitive movements within repetitive fixed periods. This information may for example be used to identify gestures or specific movements, such as dance movements, as explained below with respect to FIGS. 14 and 15.

Figure 6A:
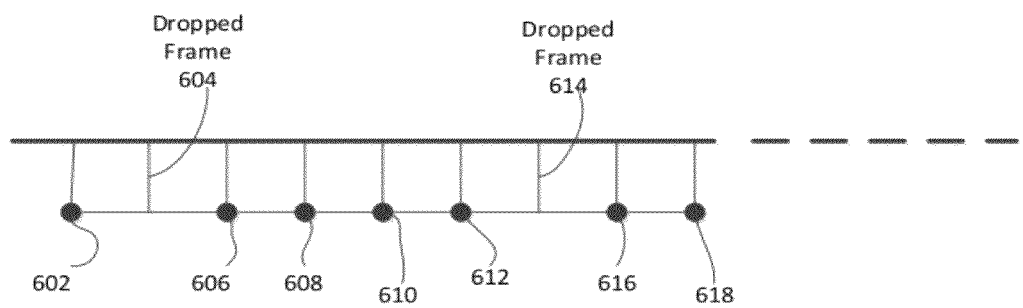
FIGS. 6A and 6B respectively illustrate an example of a captured set of frames and an example of a scaled set of frames.
Figure 6B:
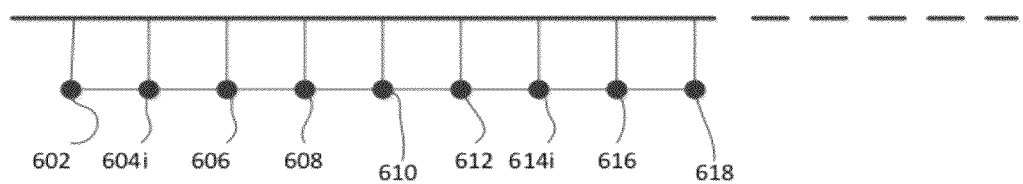

FIGS. 6A and 6B illustrate an example of a captured set of skeletal data frames derived from received frames of images captured by the capture device 20, referred to as skeletal data frames, and a scaled set of skeletal data frames respectively. In this illustrative example, the periodic unit is a beat, and the number of repeating units is 8 beats for a repeating period, called a beat period in this example.

For a selected number of periodic units in a repeating period, a number of frames is determined. For example, the number of frames can be the number of frames captured in a repeating period based on the frame rate of the capture device 20. In this example, the beat period is 8 beats, and the normalized number of frames for the beat period is 120. At a frame rate for the image capture device 20 of 30 frames per second, and a beat rate of 0.5 seconds, there are 8 beats every 4 seconds and 120 frames in 4 seconds. Based on knowledge of system parameters in the system 10, the start of the repeating period is synchronized with the start of the frame capture.

However, some frames are dropped like skipped frames 604 and 614 in FIG. 6A. The image capture device 20 did not capture an image or occlusion of the user occurred so that a skeleton was not generated for that frame. Skeleton data for the other frames, 602, 606-612 and 616-618 was captured.

In order to have 120 frames of data with skeletons, a frame is interpolated for each dropped frame. In one example, data for a frame can be interpolated from the frames which came before and after the dropped frame. A frame typically has a time stamp which indicates its place in a succession of frames. For example, interpolated frame 604$i$ is generated based on the skeleton data of frames 602 and 606, and interpolated frame 614$i$ is generated based on the skeleton data of frames 612 and 616. For example, an elbow joint may have moved from one position in three-dimensional space in frame 602 to another in frame 606. Interpolated frame 604$i$ may represent a halfway point for the elbow joint between the two positions. In this example, missing frames are interpolated to produce the exemplar set of scaled skeletal data.

In general, the present system captures information relating to the position of a skeleton, over the predefined repeating period discussed above, and determines whether the user is performing a known movement over that period. In order to reduce the data required for this analysis, the frame of reference is transformed to a body-based frame of references, where movement of body parts relative to each other, and not the field of view as a whole, are considered. Once the body-based frame of reference is defined, positions of joints relative to each other are measured for each frame. This position and angle information may then be compared against stored information to identify whether the user is performing some known movement. Each of these operations is explained below.

Figure 7:
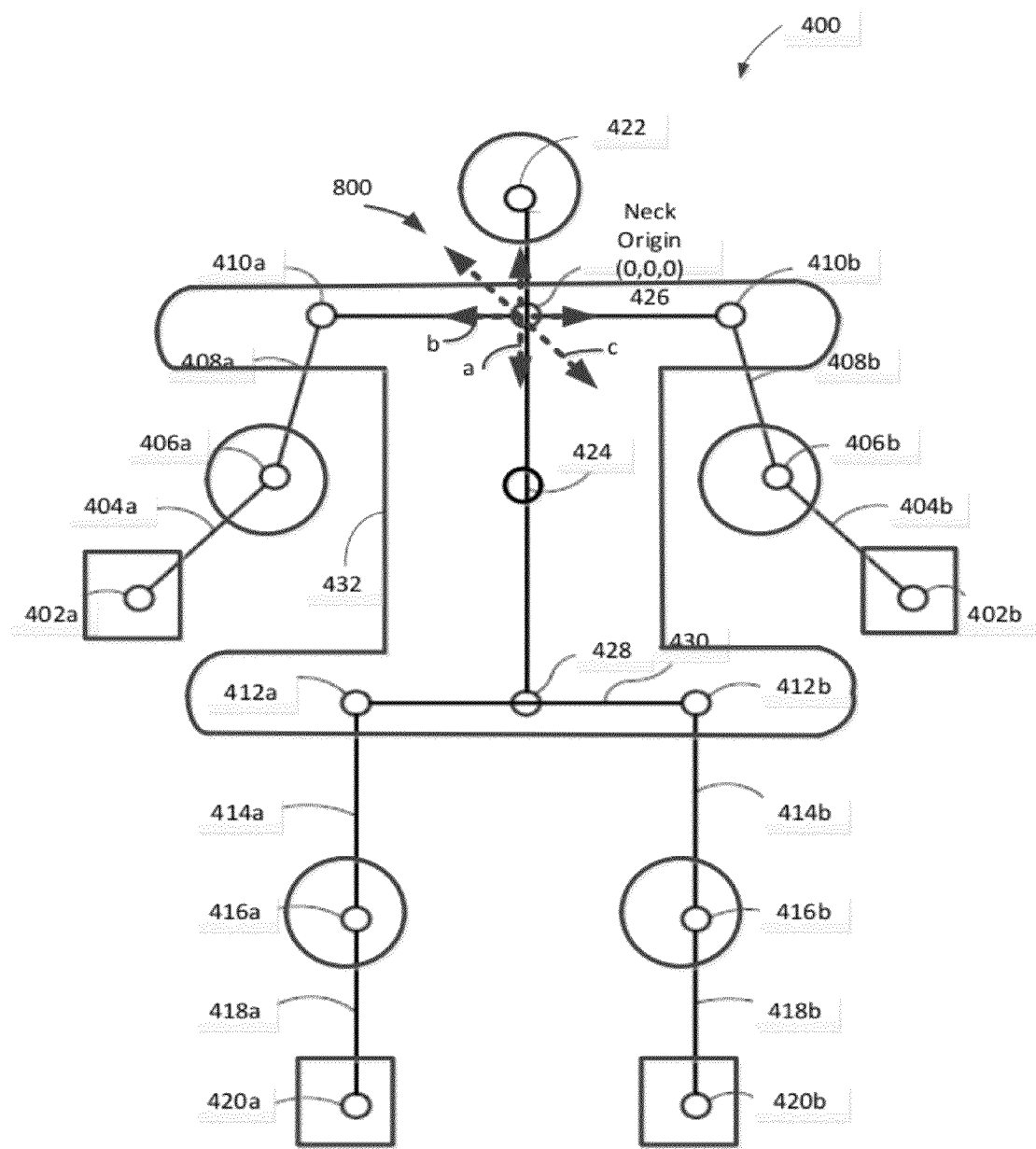
FIG. 7 illustrates an example of a skeletal model including a rigid body portion that can be used by one or more embodiments.

In step 508, software executing in the capture device 20 or the computing environment 12 or both generates a body-based coordinate 3-D reference system having a frame of reference defined with respect to a position within a rigid body portion of a skeletal model. As indicated above and as shown in FIG. 7, the present technology models a group of joints as a single rigid body 432. In one embodiment, the joints in the rigid body 432 include the neck joint 426, the two shoulder joints 410$a$ and 410$b$, the mid-spine 424 and lower spine 428 joints, and the hip joints 412$a$ and 412$b$. It is understood that the rigid body portion 432 may include fewer joints, or additional joints, in further embodiments.

The joints in the rigid body have little or no relative motion with respect to each other and, as such, are treated as a single rigid body by the present technology. Joints within the torso in reality do move, but the motion is to a much lesser extent than for a knee or a hand. The rigid body portion 432 shown in the model of FIG. 7 can be treated as a single block representing the user's body position in the camera-based 3-D coordinate system for the camera's field of view 17. If the user 18 moves left or right, forward or backward, his torso does as well and can be treated as a single unit, or rigid body. Torso data is robust in that data detected for the torso has a high probability of accuracy even when the data is very noisy.

Because the torso can be treated as a rigid body, principal component analysis (PCA) can be used to define an orthogonal 3-D coordinate system having the user's body as the frame of reference. PCA is mathematically defined as an orthogonal linear transformation that transforms the data to a new coordinate system such that the greatest variance by any projection of the data comes to lie on the first coordinate axis (called the first principal component), the second greatest variance on the second coordinate, and the third axis is the cross-product of the first two axes.

Figure 8:
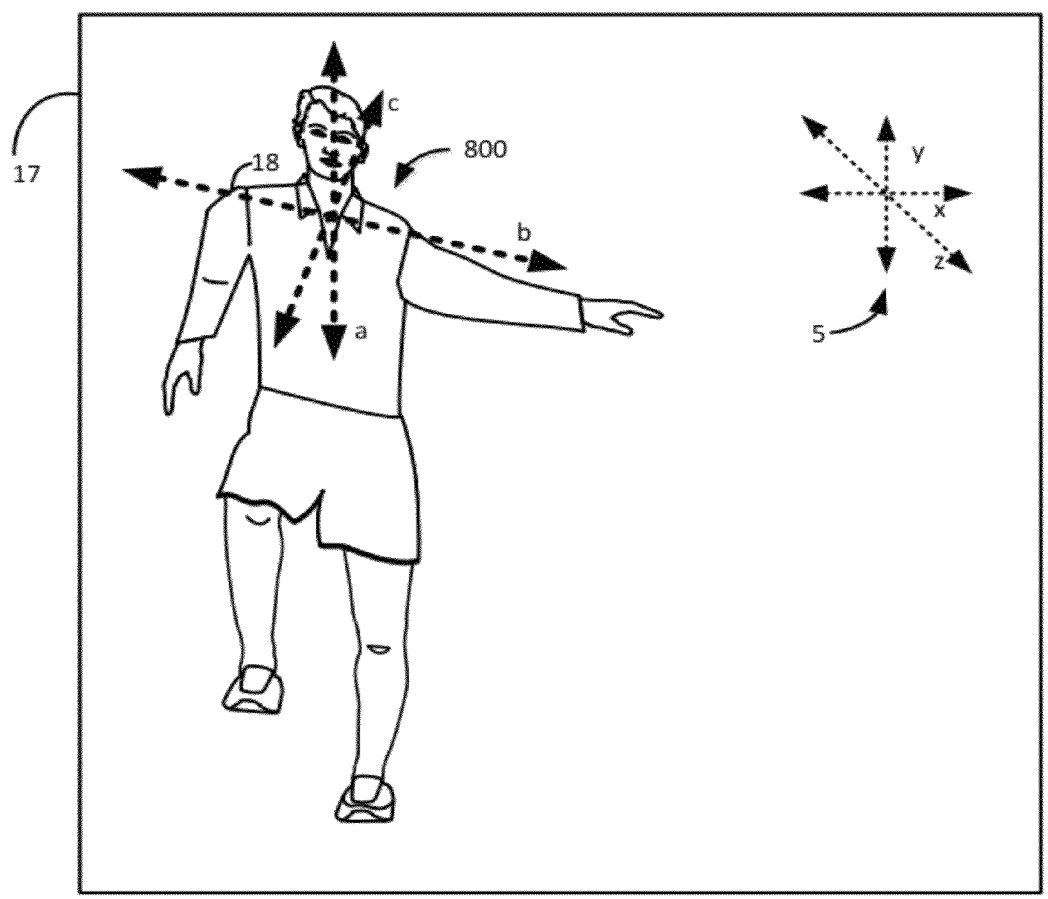
FIG. 8 illustrates an example of a camera-based 3-D reference system and an example of a body-based 3-D reference system.

FIG. 8 illustrates an example of a fixed camera-based 3-D reference system 5 and an example of a body-based 3-D reference system 800. In this example, the a-axis is the axis of maximum variability, the length of the spine in FIG. 4B, the b-axis the axis of next most variability, the axis from shoulder to shoulder, and the c-axis the cross product of axes a and b, a ray out from the chest of a user. The orientation of the a, b, c system 800 varies within the camera-based reference system 5.

In step 508, the system 10 performs PCA on data points, the shoulders, neck, spine joints, and hip joints (seven joints), of the rigid body portion 432 of the skeletal model 400 to obtain axes of an orthogonal coordinate system defined with respect to the rigid body portion. For each frame, the capture device 20 or the computing environment 12 or both together return a skeletal data set representing the position of the user in the body-based reference frame.

FIGS. 7 and 8 show examples of a body-based 3-D coordinate reference system embodiment 800 having an origin (0,0,0) at the neck 426 (labeled in FIG. 7), with an a-axis extending along the spine, a b-axis extending across the shoulders and orthogonal to the a-axis, and a c-axis orthogonal to the plane formed by the a and b axes and representing motion in and out of that plane. The positive c-axis extends from the neck out of the page. It is understood that the origin may be positioned at locations within the rigid body 432 other than the neck joint 426.

The vectors a, b and c determined by PCA will be based on the user position relative to the camera. Computing the vectors a, b and c over the torso by PCA provides an orientation of the torso with respect to Cartesian space. Depending on where the capture device 20 is, the vectors a, b and/or c will have a different orientation.

In embodiments, the next step (510) in the process involves describing the rigid body-based vectors a, b and c in terms of the camera-based 3-D coordinate system for each frame of the scaled skeletal data. While this may be done by a variety of methods, in one example explained below, Euler angles may be used for this transformation. In one example, the type of Euler angles used are pitch, yaw and roll, also known as Tait-Bryan angles. Other types of Euler angles may be used in further embodiments. Another possible method for this transformation beside Euler angles is a direction of cosines approach.

Figure 9:
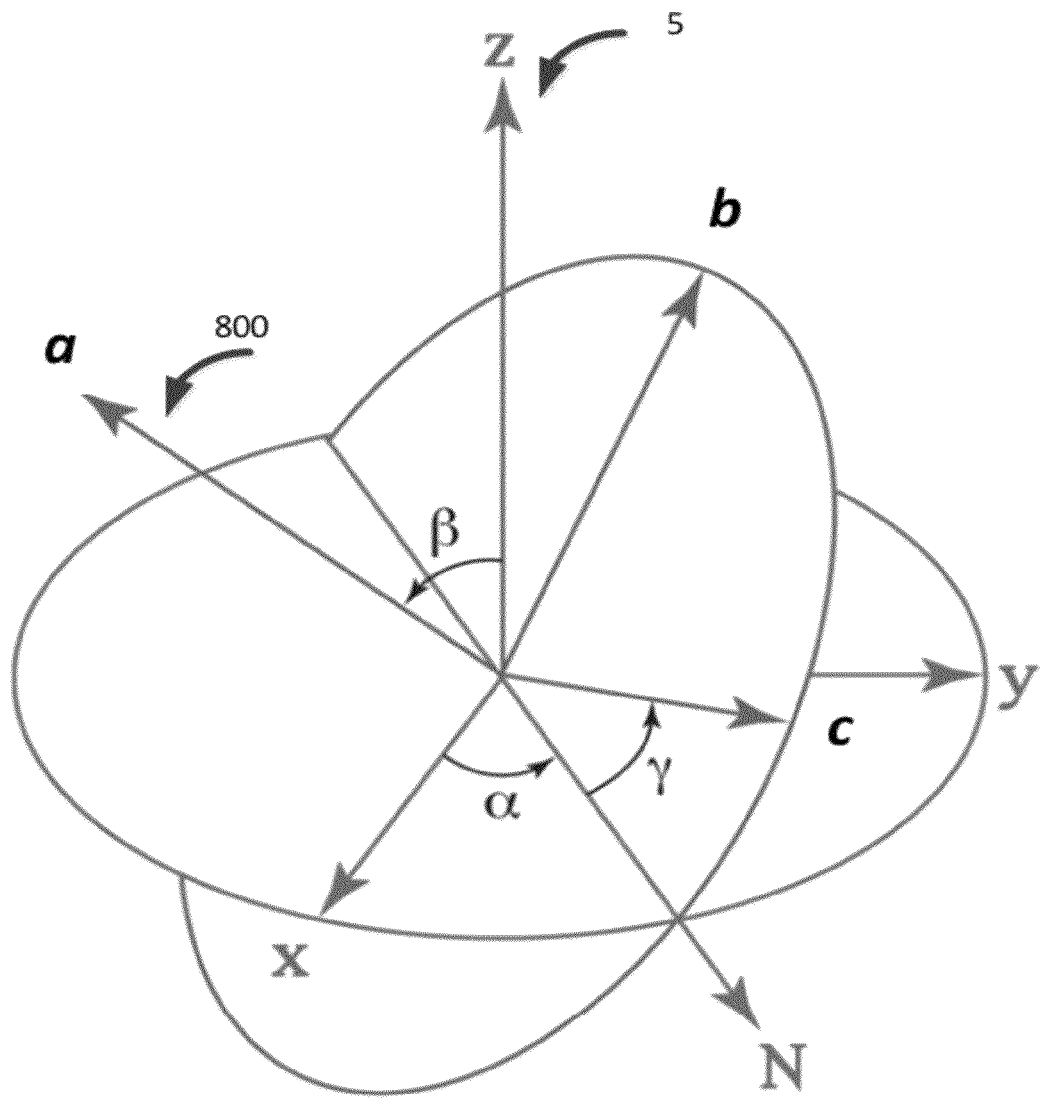
FIG. 9 illustrates an example of a camera-based 3-D reference system superimposed with a body-based 3-D reference system with three angles for transforming between them.

FIG. 9 illustrates the coordinate systems 5 and 800 superimposed on each other with three Euler angles for transforming between them for a given skeletal data frame. Euler angles can be used to represent the spatial orientation of any coordinate system, such as that for a rigid body vectors a, b, c, as a composition of rotations from a frame of reference coordinate system, such as the camera-based reference system x, y, z. In the example of FIG. 9, the intersection of the xy and the be coordinate planes is vector (N) which is a line perpendicular to both the z and a-axis, sometimes referred to as the line of nodes. Alpha α is the angle between the x-axis and the vector N. Beta β is the angle between the z-axis and the a-axis. Gamma γ is the angle between the vector N and the c-axis. In other examples, the angles could be between other axes pairings just as long as the transformation angles represent consistent pairings.

A composition of rotations is composing three rotations, each around a single axis. In this way, Euler angles can be used to represent the relative orientation of the body based coordinate system to the camera-based coordinate system. For each rotation, Euler rotations are defined as the movement obtained by changing one of the Euler angles while leaving the other two constant. Euler rotations are expressed in terms of the camera-based coordinate system, the body based coordinate system and intermediate coordinate reference systems. There are also a number of valid known sequences of rotations. The axis selected for the start of rotation is arbitrary, but it cannot be used twice in succession. For example, using these mixed axes of rotation, the first angle moves the line of nodes around the fixed axis z, the second rotates around the vector N, and the third one is an intrinsic rotation around an axis fixed in the body that moves, in this example axis c.

Additional information on transformation between coordinate systems using Euler angles is provided at http://en.wikipedia.org/wiki/Euler_angles and http://www.aoe.vt.edu/~durham/AOE5214/Ch03.pdf, Ch. 3 Coordinate System Transformations, pp. 23-39, which sources of this information are incorporated by reference herein in their entirety. It is understood that transformations between camera-based 3-D space and body-based 3-D space may be made by a variety of other known transformation matrices and equations. For example, the orientation of a rigid body can be represented by an orientation matrix, which includes, in its three columns, the Cartesian coordinates of three points. These points are used to define the orientation of the axes of the local system; they are the tips of three unit vectors aligned with those axes.

With each set of capture data, e.g., each frame of the scaled skeletal data, the three Euler angles are transformation angles which can be used to represent the position of the rigid body torso in terms of the camera-based orthogonal 3-D coordinate system 5 in order to determine motion of the torso. For example, this determination can tell if a user is standing sideways or is twisting his torso. The software executing on a processor in the target recognition, analysis, and tracking system 10 determines a Euler transformation angle α, β, γ between each axis of the rigid body coordinate system and an axis of the fixed camera-based coordinate system, and these three angles form part of a motion determination data set for each scaled data set.

With the definition of the torso in terms of the camera-based orthogonal 3-D coordinate system 5, for example by Euler angles as described above, the torso is now defined independently of the camera position. The next step (512) is to describe the positions of first degree and second degree joints extending from the torso. In particular, if the location of a joint is known with respect to the torso, and the torso's location is known with respect to the fixed camera-based 3-D coordinate system, the absolute motion of the joint, for example an elbow, can be represented in terms of the relative motion of the joint with respect to the torso, and the motion of torso with respect to the camera-based 3-D reference system.

Referring again to FIG. 7, the first degree joints are those which are one joint away from the rigid torso (elbow joints 406 and knee joints 416), as indicated by circles in FIG. 7. These first degree joints may be thought of as being anchored to the rigid body by a constant bone length. The second degree joints are those which are one joint away from the first degree joints (wrist joints 402 and ankle joints 420), as indicated by squares in FIG. 7. These second degree joints may be thought of as being anchored to the first degree joints by a constant bone length. In one example, the skeletal model of FIG. 7 can be thought of as a tree structure in which the rigid body torso is the base of the tree, and the user's arms, legs and head forming branches extending from the base of the tree.

Figure 10:
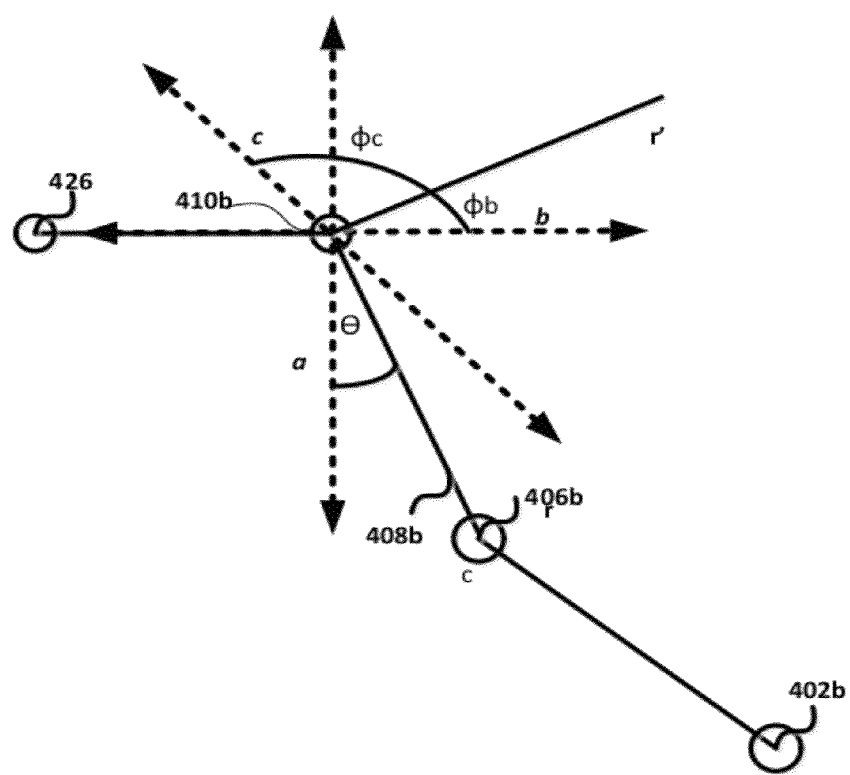
FIG. 10 illustrates an example of a skeletal model including a rigid body portion in which a body-based 3-D orthogonal coordinate system is translated from the origin within the rigid body to another joint within the rigid body.

FIG. 10 illustrates an example in which a body-based 3-D orthogonal coordinate system of a skeletal model including a rigid body portion is translated from the origin within the rigid body to another joint within the rigid body. For a joint in the set of first degree joints, the joint in the rigid body to which it is attached is stationary and can be treated as an origin of a coordinate reference system. For example, in FIG. 10, the origin is translated from the neck joint 426 along the b-axis to the right shoulder 410b so that the position of the left elbow 406b may be calculated relative to the left shoulder. Given the normalized, known translation distances between joints, the distance from neck to right shoulder is known.

Additionally, within the rigid body, the joints are deemed stationary and separated by known, normalized distances between joints. Thus, for example, a translation of the reference system having its origin at the neck can be linearly translated to another joint in the rigid body. For example, as shown in FIG. 9, the origin at neck joint 426 is translated along the b-axis to the right shoulder 410b.

The present system treats the same body parts in human bodies as connected in a known, tree-like relation. For example, the right elbow 406b is connected to the right shoulder 410b via an upper arm bone 408b. This known connectedness in addition to the bone sizes being normalized allows the system to predetermine the translation of the origin of the a, b, c vector reference system for the different joints of the skeleton.

Figure 11:
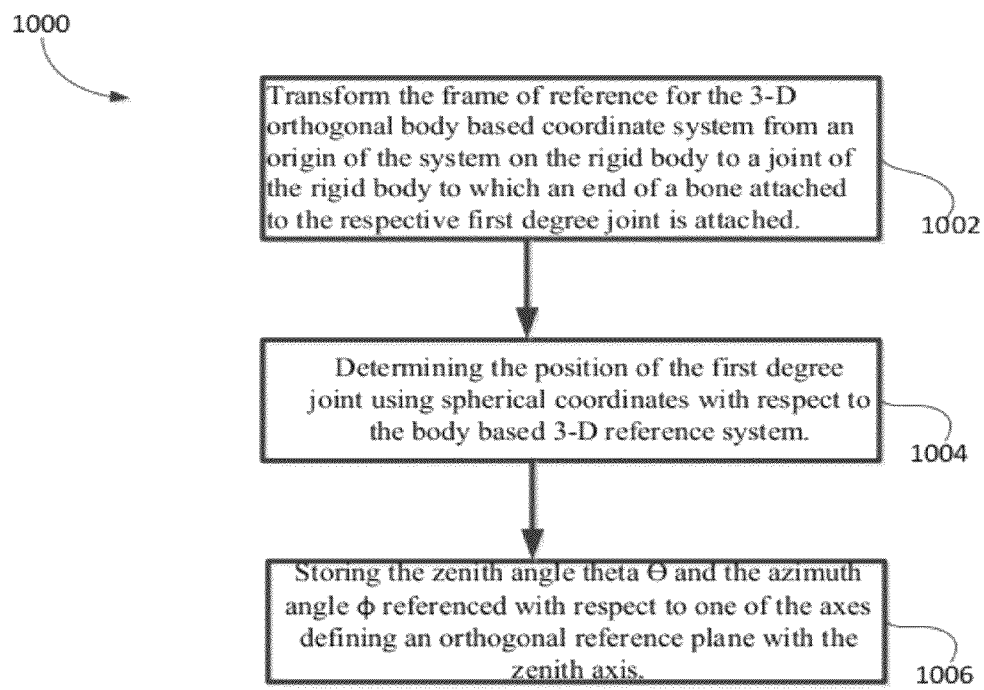
FIG. 11 is a flowchart of an embodiment of a method for representing motion of a joint in the set of first degree joints attached to the rigid body portion.

FIG. 11 is a flowchart providing further detail of step 512 for representing motion of a joint in the set of first degree joints attached to the rigid body portion. In this embodiment, software executing on a processor of a target recognition, tracking and analysis system translates 1002 the frame of reference for the 3-D orthogonal body-based coordinate system from an origin of the system on the rigid body to a joint of the rigid body to which an end of a bone attached to the respective first degree joint is attached. The position of the first degree joint is determined 1004 using spherical coordinates with respect to the body-based 3-D reference system. A point in 3-D space can be represented by a radial distance r from a fixed origin, an inclination or zenith angle θ measured from a fixed zenith direction, and an azimuth angle φ of its orthogonal projection on a reference plane that passes through the origin and is orthogonal to the zenith. The azimuth angle is measured from a fixed reference axis on the plane. (See http://en.wikipedia.org/wiki/Spherical_coordinate_system.)

Referring back to FIG. 10 for illustrative purposes only and not to be limiting thereof, the upper arm bone 408b between the right shoulder 410b and right elbow 406b is the radial distance. This is a constant, so the system need not calculate or store its length for each set of the scaled data. The a-axis acts as the zenith or spherical north which forms the zenith angle or inclination angle theta θ. This angle theta θ is measured between the a-axis and the upper arm bone 408b. Axes b and c form a reference plane passing through the origin with a and orthogonal to a as zenith in which the perpendicular projection r' of the upper arm 408b is projected. The azimuth angle φb is measured from the b-axis to the projection r' and the azimuth angle φc is measured from the c-axis to the projection r'. Due to being in the same plane and being measured from fixed reference axes, φ with respect to one planar axis can be determined from φ with respect to the other axis. Mathematically, φc=π/2−φb. However, if −π/2<φb,c<π/2, then the information from φb and φc is not redundant. Thus, θ may be stored, and, in different embodiments, one or both angles φb and φc may be stored.

Figure 12:
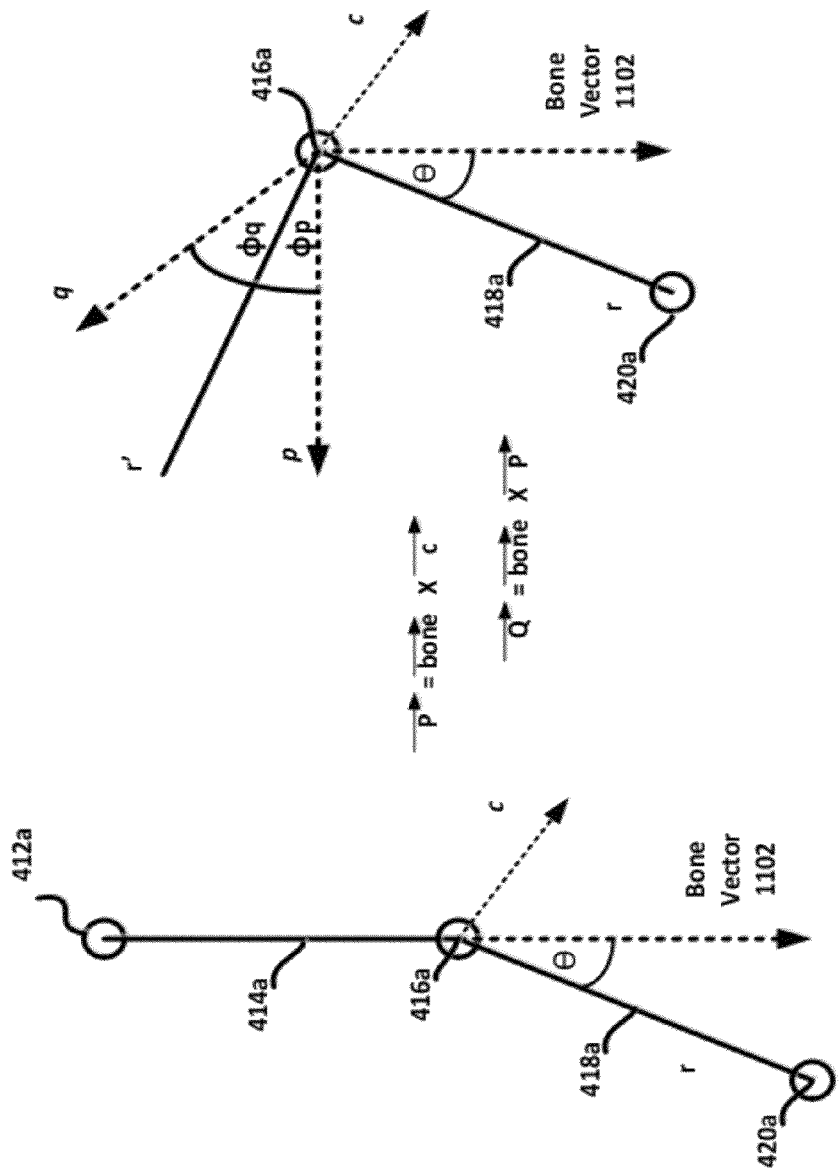
FIG. 12A illustrates an example of another translation of a body-based 3-D coordinate system having an origin in the rigid body portion to at a first-degree joint in a set of the scaled skeletal data for determining motion of a second-degree joint.
FIG. 12B illustrates an example of a 3-D orthogonal coordinate system centered at a first degree joint which is used for determining motion of a second degree joint attached to a common bone.

The zenith angle theta θ and the azimuth angle φ referenced with respect to one of the axes, b or c, defining the orthogonal reference plane in which the perpendicular projection of the bone is made, φb or φc, are stored 1006 in a motion determination data set for the first degree joint in one of the sets of scaled skeletal data FIG. 12A illustrates an example of another transformation of a body-based 3-D coordinate system having an origin in the rigid body portion to at a first degree joint in a set of the scaled skeletal data for determining motion of a second degree joint. The foot joint 420a is in the set of second degree joints in which each respective joint is attached to a bone 418a, another end of which is attached to one of the joints in the set of first degree joints, in this case knee 416a. Just as the torso based coordinate system was moved within the rigid body, the origin can be translated into the first degree knee joint 416a which is attached via a bone 414a to the hip joint 412a within the rigid body torso 432. The knee 416a moves around, but the rigid body torso based 3-D coordinate reference system provides robust or accurate data with respect to the axis c coming out of the chest of the skeletal model. Additionally, the bone 414a between the hip 412a and the knee 416a are very reliable and the foot 420a is always attached to the knee 416a. It is also constant size due to the normalization. The bone 414a between the hip and knee is extended out the other side of the knee and acts as a zenith or spherical north from which a zenith or inclination angle theta θ can be defined with the shin bone 418a between the knee 416a and the foot 420a.

However, the bone extension vector 1102 is not necessarily orthogonal to the c vector of the torso transformed coordinate system 800 of axes a, b and c.

FIG. 12B illustrates an example of a 3-D orthogonal coordinate system centered at a first degree joint which is used for determining motion of a second degree joint attached to a common bone. An orthogonal 3-D coordinate system is generated with the knee 416a as origin and the bone extension 1102 as the zenith axis. The cross product of the c vector and the bone vector 1102 results in vector P, and another orthogonal vector Q is generated by crossing the bone vector 1102 with P.

FIG. 12B represents the relationship between the second degree joint, foot 420a, and a first degree joint, knee 416a, using another 3-D coordinate reference system with its origin at the first degree joint, the orthogonal system defined by the bone vector and vectors P and Q. Now the position of the second degree joint foot 420a can be represented in spherical coordinates of a zenith angle θ formed between shin bone 418a and the bone vector 1102 and an azimuth angle, either φp or φq, formed by the perpendicular projection r' of the shin bone r in the reference plane formed by P and Q which is orthogonal to the bone vector.

Figure 13:
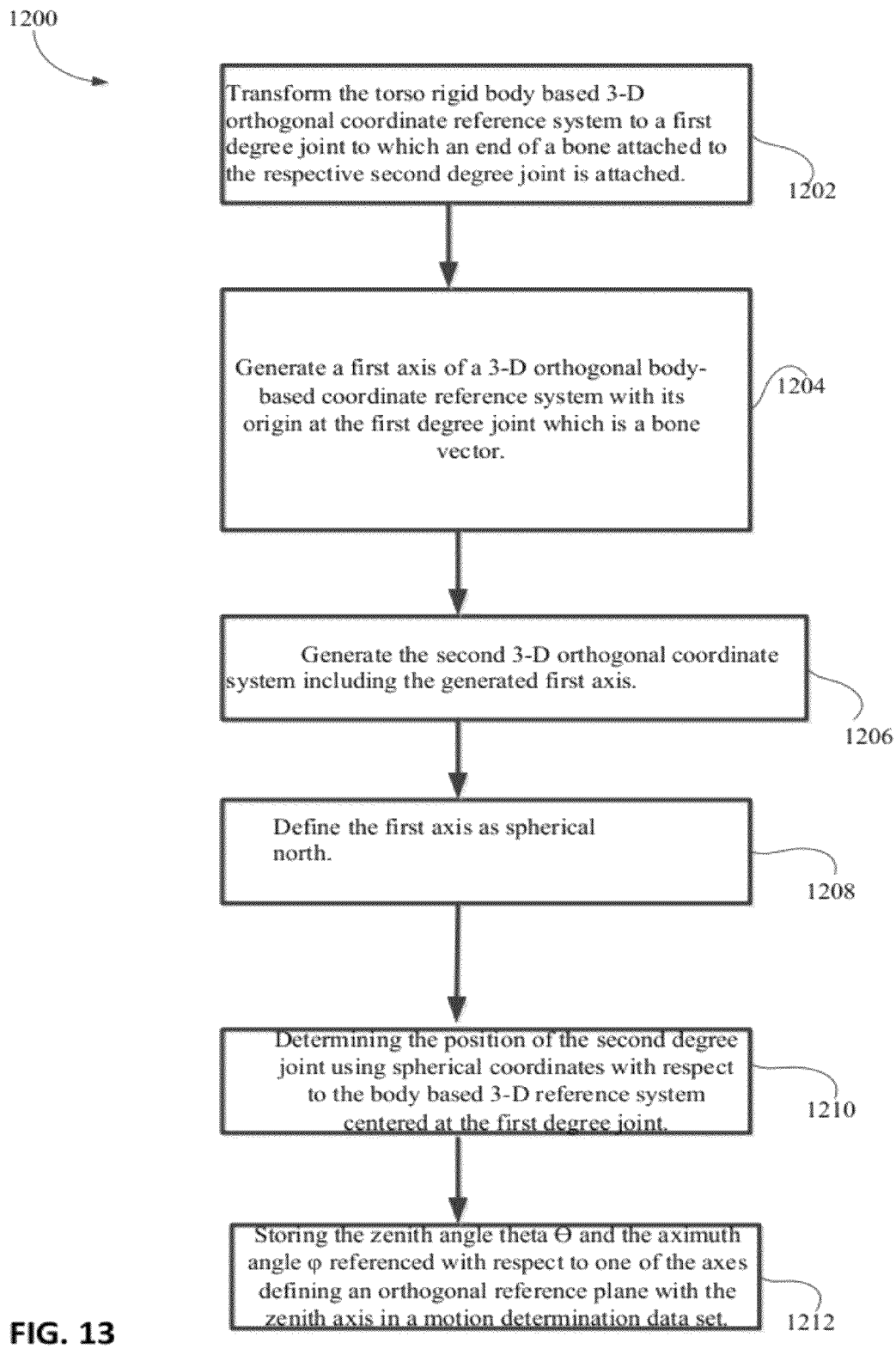
FIG. 13 is a flowchart of an embodiment of a method for representing motion of a joint in the set of second degree joints.

FIG. 13 is a flowchart of an embodiment of a method for representing motion of a joint in the set of second degree joints attached to a joint in the set of first degree joints. In this embodiment, software executing on a processor of a target recognition, tracking and analysis system, translates 1202 the torso rigid body-based 3-D orthogonal coordinate reference system to a first degree joint to which an end of a bone attached to the respective second degree joint is attached.

A first axis of a 3-D orthogonal body-based coordinate reference system with its origin at the first degree joint is generated 1204 which is a bone vector. The bone vector is created by extending a bone attached to a joint of the rigid body at one end and which is attached at the other end to the first degree joint also attached to the bone to which the respective second degree joint is attached.

The software generates 1206 the second 3-D orthogonal coordinate system including the generated first axis, and defines 1208 the first axis as spherical north or the zenith and determines 1210 the position of the second degree joint using spherical coordinates with respect to the 3-D reference system centered at the first degree joint. The zenith angle theta θ and the azimuth angle φ referenced with respect to one of the axes, P or Q, defining an orthogonal reference plane with the zenith axis, the bone vector, are stored 1212 in a motion determination data set. A motion determination data set for each scaled skeletal data set is desired to be as small as possible and the least dimensions in space that need to be represented the better.

As mentioned above, the three angles will be part of the motion determination data set for each set to relate the moving body-based (a,b,c) system, which moves with the user's torso as the user moves, to the fixed camera-based reference system. In the example model of FIG. 7, there are 9 joints outside the rigid body. In the examples discussed above, because the bone sizes were normalized, only the spherical coordinate systems zenith and azimuth angles for each joint is stored in the motion determination data set. For these examples, the motion determination data set representing the change of positions of joints and bones in each frame is optimized to a lower entropy data set of 21 items for each frame.

Once the positions and angles of different joints in the body are identified, this information may be compared against stored information for known gestures. As used herein, gestures may include body positions, angles or movements performed by a user which are recognized as a known, predefined movement such as a particular dance or exercise routine, or portion of a dance or exercise routine. As indicated at step 514 in FIG. 5, once joint positions and angles have been identified, the system determines whether a joint position and/or angle indicates that a known gesture was performed.

The identification of a known gesture from the frames of image data processed as described above may be done by any of a variety of arbitrary classification systems. These systems receive, for example, 120 frames of dance (or other) motion represented by the model. This data sequence is supplied as input to a classifier which selects a predefined motion out of a number of predefined motions that most closely fits the data sequence. Classification is well known in machine learning, and numerous classifiers could be used. One of many such classifiers is explained below with reference to FIGS. 14 and 15. Other classifiers may for example use Hidden Markov Models and logistic regression.

Figure 14:
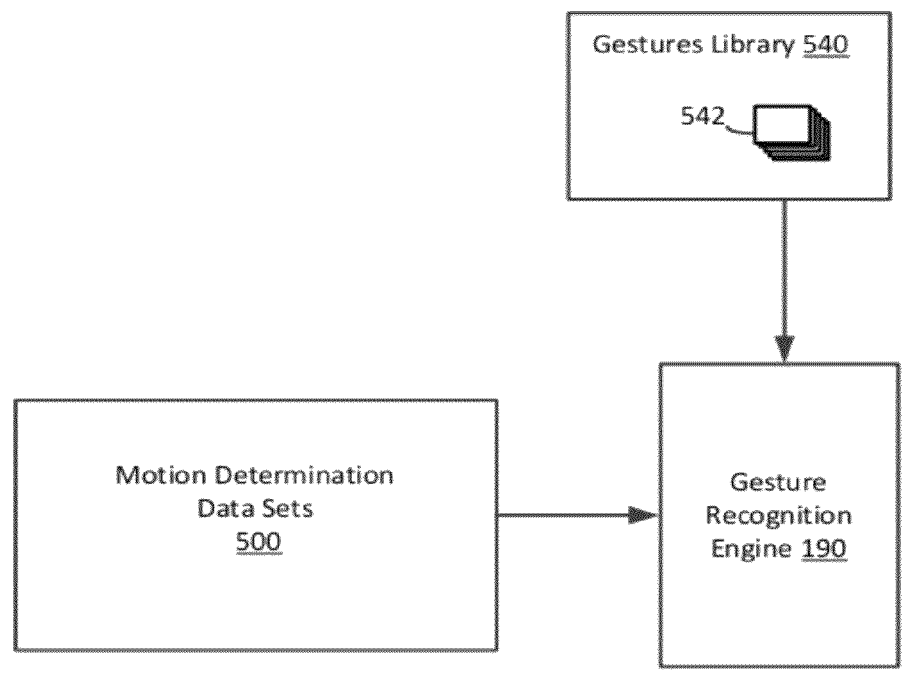
FIG. 14 shows a block diagram of a gesture recognition engine embodiment.
Figure 15:
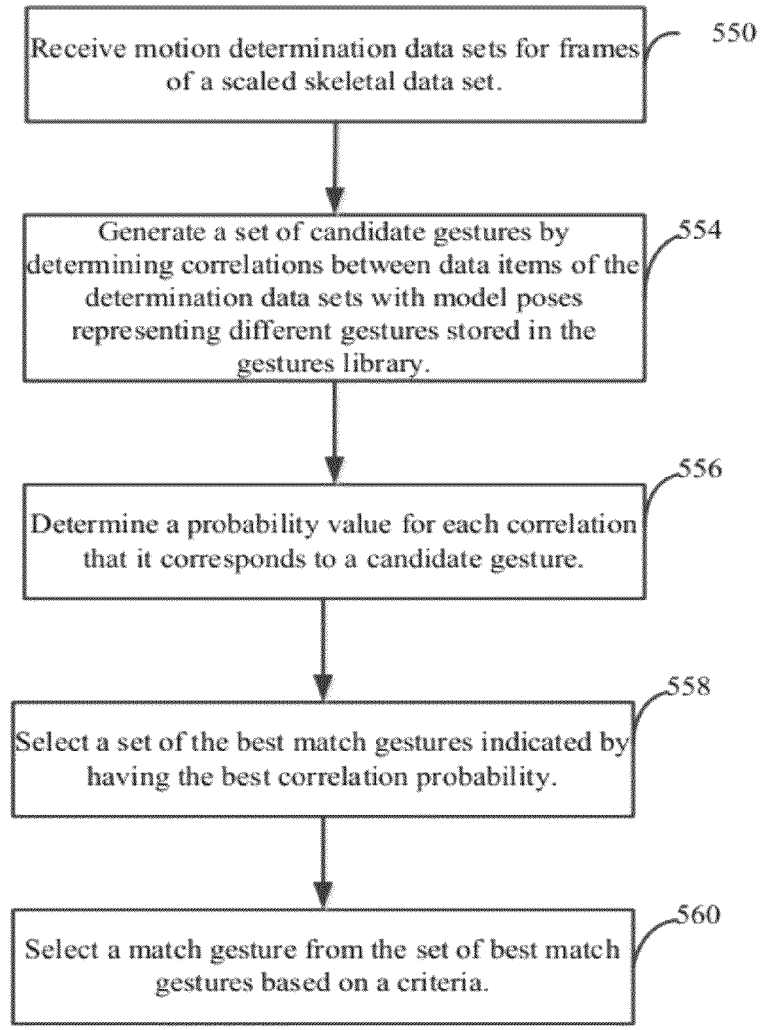
FIG. 15 shows a flowchart of the operation of the gesture recognition engine of FIG. 14.

FIG. 14 shows a block diagram of a gesture recognition engine 190 embodiment, and FIG. 15 shows a flowchart of an exemplary operation of the gesture recognition engine 190 of FIG. 14. The gesture recognition engine 190 processes the motion determination data sets 500. In this embodiment, a gestures library 540 accessible by the gesture recognition engine 190 stores predefined gesture rules 542 to represent models of gestures against which a user's movements can be correlated. Other data formats besides rules can be used to define model gestures. In embodiments, each gesture may have a different, unique rule or set of rules 542. A stored rule may define, for each parameter and for each body part, a single value, a range of values, a maximum value, a minimum value or an indication that a parameter for that body part is not relevant to the determination of the gesture covered by the rule. Rules may be created by a game author, by a host of the gaming platform or by users themselves.

In this embodiment, the parameters for the rules 542 are defined for data represented in the motion determination data sets. In other words, in terms of the 3 transformation angles relating the torso position to the fixed camera-based coordinate reference system, and the spherical coordinate system angles of a zenith angle and an azimuth angle for each joint outside the rigid body.

In step 550, the gesture recognition engine 190 receives motion determination data sets for frames of a scaled skeletal data set, and generates 554 a set of candidate gestures. In this example, correlations are determined 554 between data items of the determination data sets with averages of model poses representing different gestures stored in the gestures library to generate the candidate gestures. Due to the quasi-periodic nature of the pose information represented in the parameter information for the rules and the motion determination data sets, a Fast Fourier Transform (FFT) can be applied to the motion determination data sets for faster determination of correlation of the user's movements with gesture models. The periodic nature of the signals allows the use of circular correlation and therefore FFT can be used for the computation.

A probability value for each correlation is determined 556 that represents its correspondence to a candidate gesture over time. For example, a probability value for each correlation of a frame that it corresponds to a candidate gesture can be summed over the time period of the scaled skeletal data set to generate a sum of probability values. In one example, the sum can be weighted. For example, an exponentially decaying weighting can be used.

A set of best match gestures are selected 558 which have the best correlation probability. For example, the two gesture models having the highest sums of weighted correlation probabilities can be selected. The gesture recognition engine 190 selects 560 a match gesture from the set based on a criteria. For example, a logistic regression can be applied to the correlations with the two gesture models having the highest sums of probabilities. For each of the two best candidate gestures, a linear function can be computed of its correlation probabilities, and the one with the larger linear function satisfies the criteria.

Once a predefined gesture is recognized, this information may be used in a variety of ways. For example, step 516 in FIG. 5 indicates that a score and/or distance metric may be determined based on how well the user is performing a given recognized dance, exercise or other gesture. In examples, the score may be based on a distance metric, which is a determination of how closely the user's body positions, angles and/or movements match an "oracle" for the identified gesture. The oracle for an identified gesture represents the ideal body part positions, angles and/or movements set forth in the rule for the identified gesture. The oracle represents the data in the same format as the above-described computer model representation of the data. A score may be generated from this determination and the score may be displayed to the user on audiovisual device 16.

In one embodiment, step 516 may further provide feedback to the user indicating that the user is performing a dance, exercise or other identified gesture well or poorly. This aspect may further indicate a particular body part of the user that is performing the identified gesture well or poorly. For example, in FIG. 1C, the highlighted leg on the displayed user avatar 21 indicates to the user that his kicks are not being performed properly and need improvement. Alternatively, some other distinctive visual aspect associated with a body part may indicate that the user's movements of that body part closely match the idealized movement for that body part in a given dance, exercise or other identified gesture. The indicator may be audible instead of or in addition to being visual.

The positions, angles and/or movements for the oracle of a given stored gesture may be determined a variety of ways. For example, a model of stored gesture information may have been captured of a professional instructor performing a gesture. In another example, the model may represent an average of other users who use the game or multimedia application, so the user can see how he compares to other users.

In one example, a distance metric can be used to represent the user's deviation from the model. For example, a distance vector representing the user's movements derived from the motion determination data sets of the skeletal data can be compared with a vector of the movements of the oracle to determine the deviation. This deviation score can be summed across all joints to compute an overall score for the user's performance in the game or multimedia application. For example, the better the user performs dance moves, the better his score or advancement in the dance multimedia application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of scalable real-time motion recognition and/or similarity analysis of human body motion based on skeletal model data derived from image data of a user comprising:
   (a) detecting an object from data received by a capture device;
   (b) determining whether the object detected in said step (a) corresponds to a human user;
   (c) directly detecting positions of body parts of the user where it is determined in said step (b) that the detected object comprises a human user and the data comprises skeletal data, the data represented in a 3-D reference system of the capture device;
   (d) transforming the data into a body-based coordinate 3-D reference system having a frame of reference of the user, the body-based coordinate 3-D reference system including a plurality of joints described as a single rigid body so that the plurality of joints do not move relative to each other; and
   (e) outputting a computer model of the user based in part on body-based coordinate 3-D reference system.

2. The method of claim 1, further comprising the step (f) of temporally scaling the received skeletal data received in said step (c) by synchronizing the skeletal data to a predetermined number of sets for a number of periodic units wherein the periodic unit is rhythmic.

3. The method of claim 2, wherein the periodic unit is a beat of music.

4. The method of claim 1, wherein said step (d) of translating the data into a body-based coordinate 3-D reference system having a frame of reference of the user comprises the step of obtaining three orthogonal axes for the body-based 3-D coordinate reference system by performing a principal component analysis on a set of data points representing the rigid body portion of the skeletal model.

5. The method of claim 1, further comprising the step of translating the skeletal data from a body-based coordinate 3-D reference system to a 3-D camera space system, independent of the camera based on a respective transformation angle defined to transform each of the axes of one system to an axis of the other system.

6. The method of claim 5, wherein the model of the human body comprises a skeleton model of joints and bones including:
   a torso as the rigid body portion,
   a set of first degree joints in which each respective joint is attached to a bone, another end of which is attached to a joint in the rigid body torso, and
   a set of second degree joints in which each respective joint is attached to a bone, another end of which is attached to one of the joints in the set of first degree joints.

7. The method of claim 6, further comprising representing motion of a joint in the set of first degree joints attached to the rigid body portion in a skeletal data frame by:
   translating the frame of reference for the 3-D body-based coordinate system from an origin of the system on the rigid body to a joint of the rigid body to which an end of a bone attached to the first degree joint is attached;
   determining the position of the first degree joint in the data frame using spherical coordinate system angles with respect to the body-based 3-D reference system;
   and storing the position of the first degree joint in the skeletal data frame as the spherical coordinate system angles.

8. The method of claim 1, further comprising the step of comparing the output in said step (e) to an oracle of a predefined motion to determine if the output matches the predefined motion above some confidence threshold.

9. The method of claim 8, further comprising the step of determining on a per joint basis a distance between a joint indicated in the output of said step (e) and a corresponding joint in the oracle.

10. A system for recognizing human motion from skeletal data derived from image data comprising:
   a camera for repeatedly capturing image data sets of a human body;
   one or more processors communicatively coupled to the camera for receiving the image data sets and having access to a memory for storing the body data sets;
   the one or more processors executing software for representing the human body in the image data sets as a human skeleton model of joints;
   the one or more processors executing software for generating a body-based coordinate 3-D reference system having a frame of reference defined with respect to a position of a single rigid body;
   the one or more processors executing software for directly identifying positions of first degree joints, adjacent the single rigid body, positions of the first degree joints being defined in terms of positions of the first degree joints in relation to a position of the single rigid body;
   the one or more processors executing software for directly identifying positions of second degree joints, adjacent the first degree joints, a position of a second degree joint of the second degree joints being defined in terms of a position of the second degree joint in relation to positions of the first degree joint adjacent the second degree joint; and the one or more processors executing software for determining a motion of at least one body part using the body-based 3-D coordinate reference system and the determined positions of the first and second degree joints.

11. The system of claim 10, further comprising:
the one or more processors executing software for determining the relationship of the body-based 3-D coordinate system to the fixed camera-based 3-D coordinate system for each set of the scaled skeletal data.

12. The system of claim 11, further comprising the one or more processors executing software for scaling the received skeletal data by synchronizing the sets of skeletal data to a predetermined number of sets for a number of periodic units.

13. The system of claim 10, wherein the model of the human body comprises a skeleton model of joints and bones including:
a torso as the rigid body portion,
a set of first degree joints in which each respective joint is attached to a bone, another end of which is attached to a joint in the rigid body, and
a set of second degree joints in which each respective joint is attached to a bone, another end of which is attached to a joint in the set of first degree joints.

14. The system of claim 13, wherein determining a motion of at least one body part using the body-based 3-D coordinate reference system further comprises defining for each skeletal data frame a set of three transformation angles for transforming the rigid body portion from the rigid body-based 3-D coordinate reference system to the fixed camera-based 3-D coordinate reference system;
and spherical coordinate system angles determined for each joint to represent its position using the rigid body-based 3-D coordinate reference system.

15. One or more computer readable storage media not consisting of transitory signals, the one or more computer readable storage media having encoded thereon instructions for causing at least one processor to perform a method for recognizing a gesture from image data, the method comprising:
(a) receiving sets of skeletal data determined by the at least one processor to represent a human body in a fixed camera-based three-dimensional (3-D) coordinate reference system having a frame of reference defined with respect to a point in a camera's field of view;
(b) conforming the sets of skeletal data received in said step (a) to a body-based coordinate 3-D reference system having a frame of reference defined with respect to a position of a plurality of joints grouped together as a single rigid body portion of a skeletal model so that the plurality of joints do not move relative to each other, the body-based coordinate 3-D reference system being independent of the camera's field of view, the skeletal model includes a model of joints and bones, wherein the skeletal model includes a torso, a set of first degree joints having positions defined by the at least one processor in terms of their relation to the torso, and a set of second degree joints adjacent the first degree joints, a second degree joint of the second degree joints having a position defined by the at least one processor in terms of its relation to its adjacent first degree joint;
(c) representing the body-based coordinate 3-D reference system by one of: i) a plurality of angles that rotate the skeletal data back into the fixed camera-based 3-D coordinate reference system and ii) an orientation matrix;
(d) determining a motion of at least one body part using the plurality of angles that rotate the skeletal data back into the fixed camera-based 3-D coordinate reference system; and
(e) determining whether a gesture has been made by at least one body part based on the determined motion of the at least one body part.

16. The one or more computer readable storage media of claim 15, wherein the human skeleton model of joints and bones includes:
the torso as the rigid body portion,
the set of first degree joints in which each respective joint is attached to a bone, another end of which is attached to a joint in the rigid body torso, and
the set of second degree joints in which each respective joint is attached to a bone, another end of which is attached to one of the joints in the set of first degree joints.

17. The one or more computer readable storage media of claim 16, wherein determining a motion of at least one body part using the body-based 3-D coordinate reference system further comprises:
representing motion of a joint in the set of first degree joints attached to the rigid body portion in a skeletal data frame by:
translating the frame of reference for the 3-D body-based coordinate system from an origin of the system on the rigid body to a joint of the rigid body to which an end of a bone attached to the first degree joint is attached;
determining the position of the first degree joint in the data frame using spherical coordinate system angles with respect to the body-based 3-D reference system; and
storing the position of the first degree joint in the skeletal data frame as the spherical coordinate system angles.

18. The one or more computer readable storage media of claim 17, wherein determining a motion of at least one body part using the body-based 3-D reference system further comprises:
representing motion of a joint in the set of second degree joints in a skeletal data frame by
translating the torso rigid body-based 3-D orthogonal coordinate reference system to a first degree joint to which an end of a bone attached to the second degree joint is attached;
generating a first axis of a 3-D orthogonal body-based coordinate reference system with its origin at the first degree joint, the first axis being a bone vector generated by extending a bone attached to a joint of the rigid body at one end and which is attached at the other end to the first degree joint;
generating the second 3-D orthogonal coordinate system including the bone vector;
defining the bone vector as spherical north;
determining the position of the second degree joint in terms of spherical coordinate system angles defined with respect to the body-based 3-D reference system centered at the first degree joint; and
storing the position of the second degree joint in the skeletal data frame as the spherical coordinate system angles in a motion determination data set for the second degree joint.

19. The one or more computer readable storage media of claim 18, wherein the motion determination data set for each set of scaled skeletal data includes:

a set of three transformation angles for transforming the rigid body portion from the rigid body-based 3-D coordinate reference system to the fixed camera-based 3-D coordinate reference system; and the spherical coordinate system angles determined for each joint to represent its position.

20. The one or more computer readable storage media of claim 19, wherein determining whether a gesture has been made by the at least one body part based on the motion of the at least one body part further comprises:

generating a set of candidate gestures by determining correlations
between data items of the motion determination data sets with model poses representing different gestures;
selecting a match gesture based on a criteria; and
determining a score representing a deviation of the user's gesture from a gesture standard.

\* \* \* \* \*